US006839546B2

(12) United States Patent
Hedtke

(10) Patent No.: US 6,839,546 B2
(45) Date of Patent: Jan. 4, 2005

(54) PROCESS TRANSMITTER WITH WIRELESS COMMUNICATION LINK

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 457 days.

(21) Appl. No.: 10/128,769

(22) Filed: Apr. 22, 2002

(65) Prior Publication Data

US 2004/0203421 A1 Oct. 14, 2004

(51) Int. Cl.[7] ................................................ H04B 17/00
(52) U.S. Cl. .................. 455/67.11; 455/68; 455/67.12; 455/90.3; 455/575.1; 455/74; 455/78; 702/127; 702/138; 340/870.01; 340/870.16; 340/870.39
(58) Field of Search .............................. 455/67.11, 68, 455/67.12, 90.3, 78, 575.1, 74; 73/706; 702/127, 138; 340/870.01, 870.39, 870.16

(56) References Cited

U.S. PATENT DOCUMENTS

| 2,533,339 | A | 12/1950 | Willenborg | 177/311 |
|---|---|---|---|---|
| 3,012,432 | A | 12/1961 | Moore et al. | 73/40 |
| 3,218,863 | A | 11/1965 | Calvert | 73/398 |
| 3,232,712 | A | 2/1966 | Stearns | 23/255 |
| 3,249,833 | A | 5/1966 | Vosteen | 317/246 |
| 3,374,112 | A | 3/1968 | Danon | 117/226 |
| 3,557,621 | A | 1/1971 | Ferran | 73/398 |
| 3,697,835 | A | 10/1972 | Satori | 317/246 |
| 3,808,480 | A | 4/1974 | Johnston | 317/256 |
| 3,924,219 | A | 12/1975 | Braun | 338/34 |
| 4,008,619 | A | 2/1977 | Alcaide et al. | 73/398 |
| 4,158,217 | A | 6/1979 | Bell | 361/283 |
| 4,168,518 | A | 9/1979 | Lee | 361/283 |
| 4,177,496 | A | 12/1979 | Bell et al. | 361/283 |
| 4,227,419 | A | 10/1980 | Park | 73/724 |

(List continued on next page.)

FOREIGN PATENT DOCUMENTS

| DE | 3340834 A1 | 5/1985 |
|---|---|---|
| DE | 101 04 582 A1 | 10/2001 |
| EP | 0 524 550 A1 | 1/1993 |
| WO | WO 99/53286 | 10/1999 |

OTHER PUBLICATIONS

"Wireless R&D Aims to Boost Traffic", by M. Moore, InTech with Industrial Computing, Feb. 2002, pp. 40–41.
"System Checks Faraway Machines' Health", by J. Strothman, InTech with Industrial Computing, Feb. 2002, pp. 42–43.
Notification of Transmittal of the International Search Report or the Declaration– PCT/US03/10403.

Primary Examiner—Marceau Milford
(74) Attorney, Agent, or Firm—Westman, Champlin & Kelly, P.A.

(57) ABSTRACT

A process transmitter is configured to measure a process variable of an industrial process. A housing has a first cavity which houses first transmitter electronic circuitry and provides a barrier between the first transmitter electronic circuitry and second transmitter electronic circuitry. A non-physical electromagnetic link between the first transmitter electronic circuitry and the second transmitter electronic circuitry configured to carry data therebetween.

31 Claims, 3 Drawing Sheets

U.S. PATENT DOCUMENTS

| | | | |
|---|---|---|---|
| 4,287,553 A | 9/1981 | Braunlich | 361/283 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,370,890 A | 2/1983 | Frick | 73/718 |
| 4,389,895 A | 6/1983 | Rud, Jr. | 73/724 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,490,773 A | 12/1984 | Moffatt | 361/283 |
| 4,542,436 A | 9/1985 | Carusillo | 361/283 |
| 4,562,742 A | 1/1986 | Bell | 73/718 |
| 4,590,466 A | 5/1986 | Wiklund et al. | 340/870.28 |
| 4,670,733 A | 6/1987 | Bell | 338/36 |
| 4,704,607 A | 11/1987 | Teather et al. | 340/825.07 |
| 4,749,993 A | 6/1988 | Szabo et al. | 340/870.31 |
| 4,785,669 A | 11/1988 | Benson et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 5,094,109 A | 3/1992 | Dean et al. | 73/718 |
| 5,168,419 A | 12/1992 | Delatorre | 361/283 |
| 5,194,819 A | 3/1993 | Briefer | 73/718 |
| 5,230,250 A | 7/1993 | Delatorre | 73/733 |
| 5,233,875 A | 8/1993 | Obermeier et al. | 73/718 |
| 5,329,818 A | 7/1994 | Frick et al. | 73/708 |
| 5,492,016 A | 2/1996 | Pinto et al. | 73/724 |
| 5,542,300 A | 8/1996 | Lee | 73/724 |
| 5,606,513 A * | 2/1997 | Louwagie et al. | 702/138 |
| 5,610,552 A * | 3/1997 | Schlesinger et al. | 327/560 |
| 5,637,802 A | 6/1997 | Frick et al. | 73/724 |
| 5,642,301 A | 6/1997 | Warrior et al. | 364/571.02 |
| 5,656,782 A * | 8/1997 | Powell, II et al. | 73/756 |
| 5,665,899 A | 9/1997 | Willcox | 73/1.63 |
| 5,682,476 A | 10/1997 | Tapperson et al. | 395/200.05 |
| 5,705,978 A | 1/1998 | Frick et al. | 340/511 |
| 5,757,608 A | 5/1998 | Bernot et al. | 361/283.4 |
| 5,793,963 A | 8/1998 | Tapperson et al. | 395/200.31 |
| 5,851,083 A | 12/1998 | Palan | 403/337 |
| 5,870,695 A * | 2/1999 | Brown et al. | 702/138 |
| 5,872,494 A | 2/1999 | Palan et al. | 333/252 |
| 5,899,962 A * | 5/1999 | Louwagie et al. | 702/138 |
| 5,911,162 A | 6/1999 | Denner | 73/718 |
| 5,954,526 A | 9/1999 | Smith | 439/136 |
| 5,992,240 A | 11/1999 | Tsuruoka et al. | 73/718 |
| 6,038,927 A * | 3/2000 | Karas | 73/706 |
| 6,236,096 B1 | 5/2001 | Chang et al. | 257/419 |
| 6,295,875 B1 | 10/2001 | Frick et al. | 73/718 |
| 2002/0011115 A1 | 1/2002 | Frick | 73/718 |

\* cited by examiner

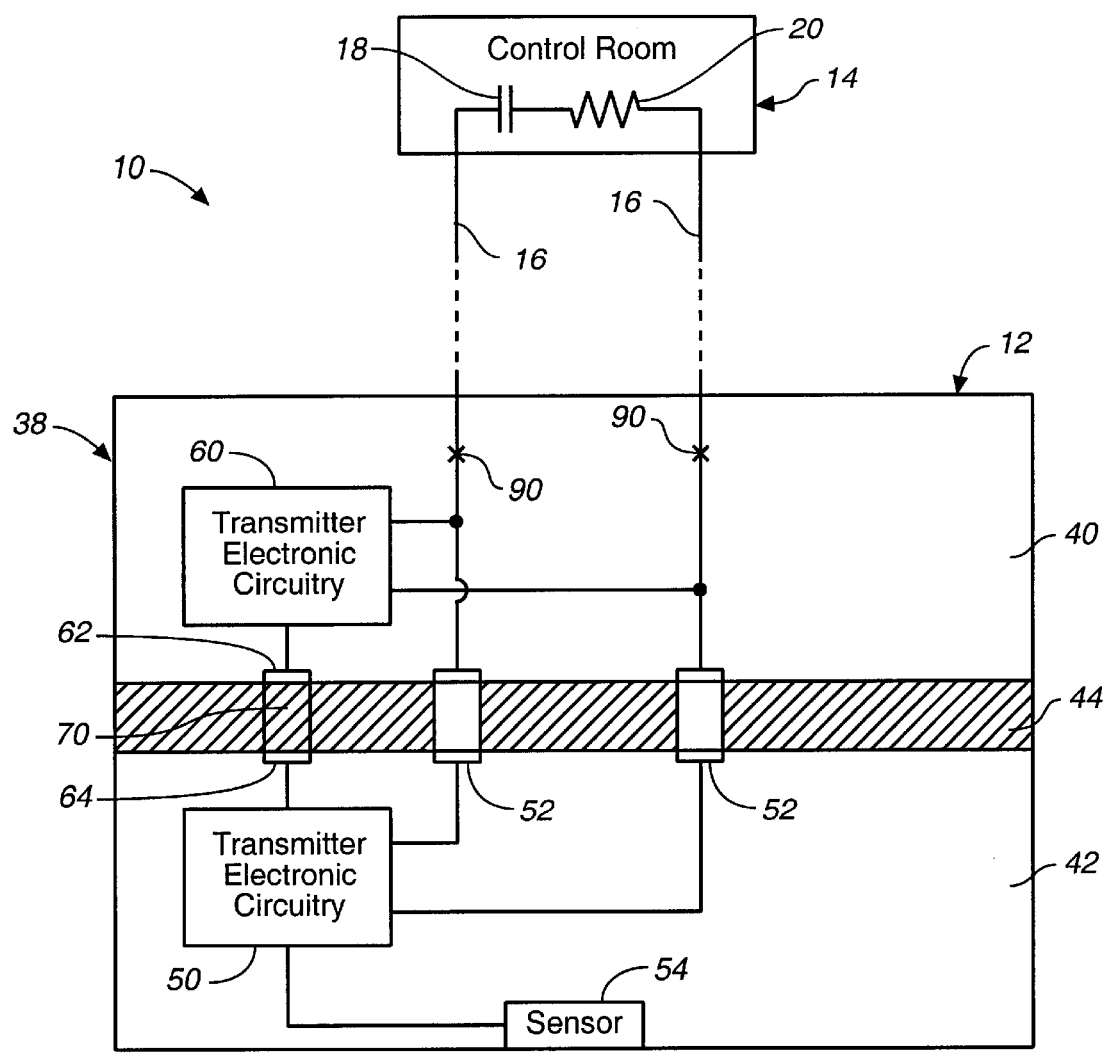
FIG._1

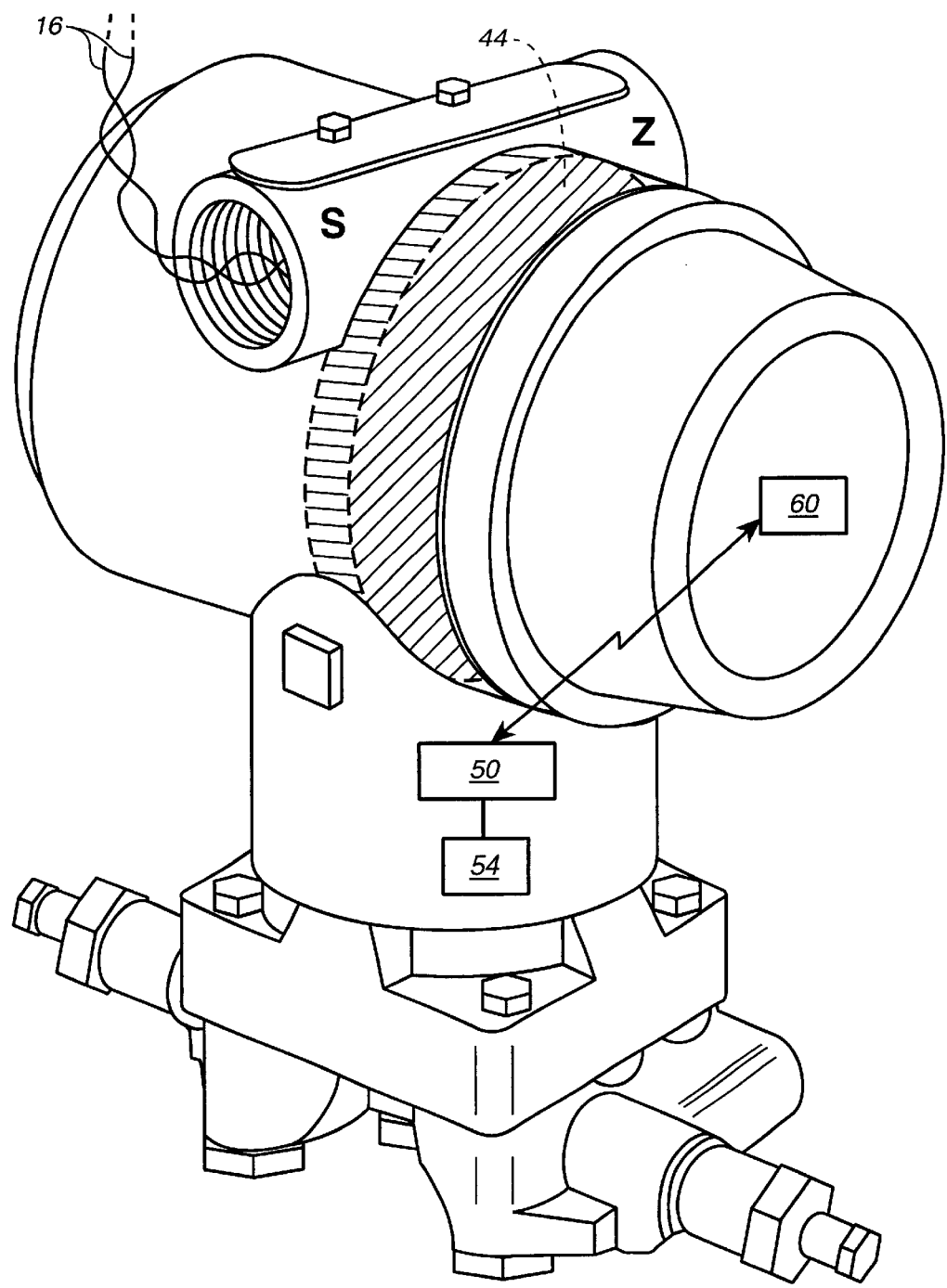
FIG._2

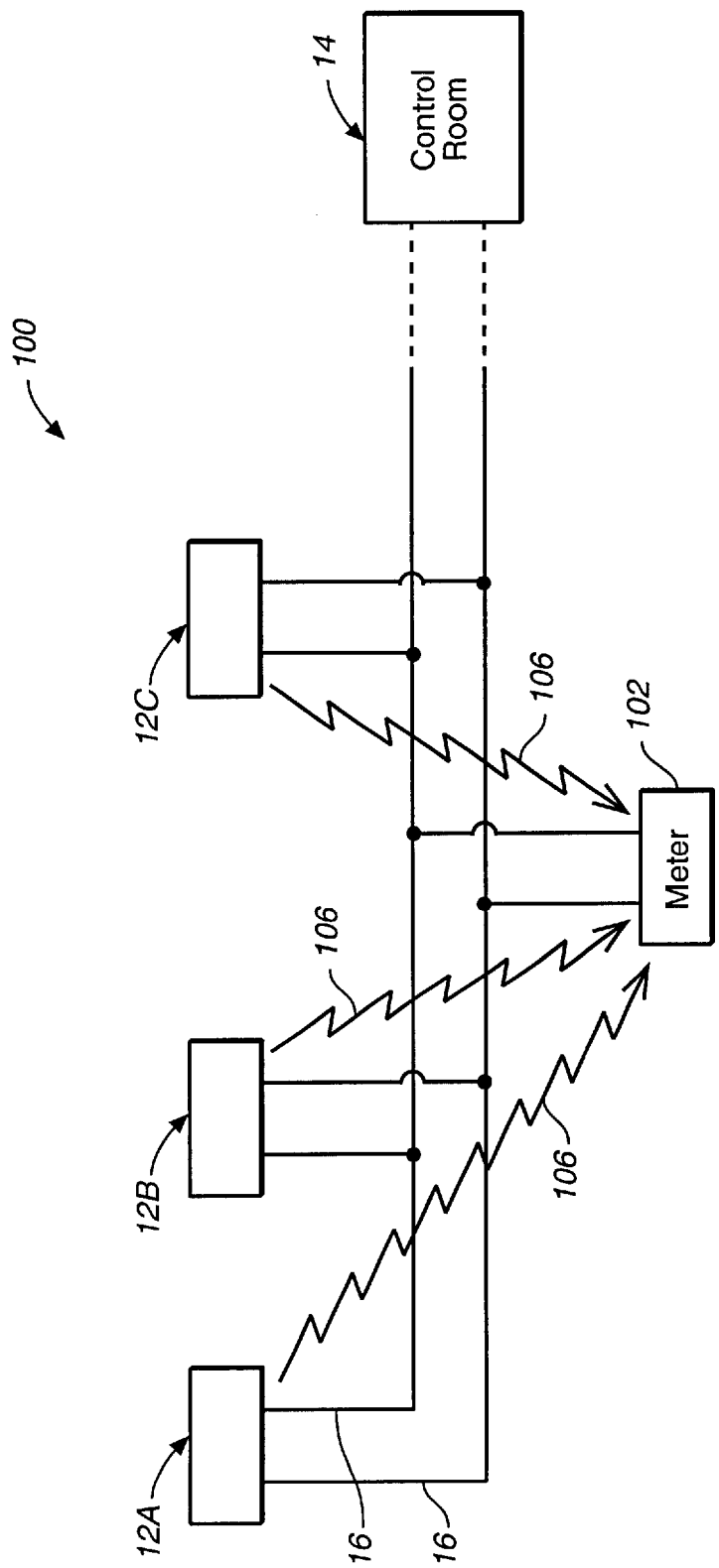
FIG._3

PROCESS TRANSMITTER WITH WIRELESS COMMUNICATION LINK

BACKGROUND OF THE INVENTION

The present invention relates to transmitters of the type used to measure process variables of industrial processes.

Process control loops are used in various industries to control or monitor operation of industrial processes. A process transmitter is typically part of the process control loop and is located in the field to measure and transmit a process variable such as pressure, flow or temperature, for example, to control room equipment. Some process control loops include a controller, such as a valve controller, which is controlled in response to the process variable sensed by the transmitter.

Process transmitters are frequently used in harsh, caustic environments or in environments which contain potentially explosive gasses or mixtures. Therefore, in order to reduce the possibility of damage to internal components of the transmitter from the caustic environment, and to reduce the possibility that internal circuitry causes an ignition of explosive gasses, the transmitter typically includes a transmitter housing which tightly seals the internal components. However, openings in the housing must be provided so that the transmitter circuitry can couple to external circuitry. To maintain a seal across these openings, each opening into the housing must be sealed using special isolation and blocking techniques. Each opening through the transmitter housing requires extra manufacturing steps and adds to the cost of the transmitter.

SUMMARY OF THE INVENTION

A process transmitter is configured to measure a process variable of an industrial process and includes a process variable sensor which senses the process variable. First transmitter electronic circuitry couples to the process variable sensor and second transmitter electronic circuitry couples to the first transmitter electronic circuitry. A transmitter housing has a first cavity which houses the first transmitter electronic circuitry. A barrier in the housing extends between the first transmitter electronic circuitry and the second transmitter electronic circuitry. A non-physical electromagnetic link couples the first transmitter electronic circuitry to the second transmitter electronic circuitry and carries data therebetween.

BRIEF DESCRIPTION OF THE DRAWINGS

FIG. 1 is a simplified block diagram of a process system including a process transmitter in accordance with invention.

FIG. 2 is a perspective view of one embodiment of the process transmitter of FIG. 1.

FIG. 3 is a block diagram of a process system in accordance with another aspect of the invention.

DETAILED DESCRIPTION OF THE PREFERRED EMBODIMENTS

In one aspect, the present invention provides a technique to reduce the number of openings or feed-throughs which must be provided through the housing of an industrial process transmitter.

FIG. 1 is a simplified block diagram of a process monitoring system 10 configured to monitor an industrial process. System 10 includes transmitter 12 which is coupled to control room 14 through a process control loop 16. Process control loop 16 is illustrated as a two-wire process control loop but can be in accordance with any format and is typically used to carry data as well as provide power to transmitter 12. Circuitry in control room 14 is modeled as a voltage source 18 and a resistance 20. Example process control loops include 4–20 mA loops, loops in accordance with the HART® standard and Fieldbus standard.

Transmitter 12 includes a transmitter housing 38 which has a first cavity 40 and a second cavity 42 formed therein. A barrier 44 separates cavities 40 and 42. Cavity 42 is hermetically sealed to prevent caustic process fluids from entering cavity 42 and to further prevent ignition of flammable process fluids due to an energy discharge from circuitry within cavity 42. Transmitter electronic circuitry 50 is carried in cavity 42 and couples to two-wire process control loop 16 through feedthroughs 52. Feedthroughs 52 can comprise one or more openings through barrier 44 and can include electrical components, such as components to reduce energy discharge, filters, etc. Transmitter electronic circuitry 50 couples to a process variable sensor 54 which is configured to sense a variable of the process. Example sensors include temperature, pressure and flow sensors. Sensor 54 can be located in cavity 42 or can be located outside of cavity 42.

Cavity 40 includes transmitter electronic circuitry 60 which also couples to two-wire process control loop 16. Transmitter 12 couples to loop 16 through loop connections 90. Loop 16 can, in some embodiments, supply all of the power consumed by circuitry 50 and circuitry 60. In accordance with one aspect of the invention, a non-physical electromagnetic link 70 extends across barrier 44 and provides a communication link between circuitry 50 and circuitry 60. Link 70 can be unidirectional or bidirectional. Communication link 70 is formed between transducer 64 which couples to transmitter electronic circuitry 50 and transducer 62 which couples to transmitter electronic circuitry 60. Transducers 62 and 64 can comprise, for example, antennas, capacitor plates or inductor elements.

Non-physical electromagnetic link 70 can be any type of electromagnetic link which does not require physical coupling. Examples include an RF (radio frequency) link, an inductive link or a capacitive link. If link 70 is an RF link, transducers 62 and 64 can comprise antennas configured to send and/or receive radio frequency signals. The frequency of the RF signals can be selected as desired as can be the shape and configuration of the antennas which provide transducers 62 and 64. If link 70 is an indcutive link, transducers 62 and 64 can comprise inductors which are placed sufficienlty close to allow signal transmission therebetween. Similarly, if link 70 is a capacitive link, transducers 62 and 64 can comprise capacitive plates.

Link 70 can carry data at any desired data rate. Faster data transmission rates tend to have larger power requirements. The particular format of the data and protocols used on links 70 can be in accordance with standardized or proprietary formats. Data link 70 can be unidirectional carrying data in one of the two directions between circuitry 50 and 60, or can be a bidirectional link. In embodiments where the circuitry 50 or 60 has sufficiently low power requirements, link 70 can also carry power to the circuitry 50 or 60 such that that circuitry does not require a separate connection to loop 16.

In operation, transmitter electronic circuitry 50 couples to sensor 54 and is used to sense and measure a process variable such as pressure, temperature, flow, level, etc. In one embodiment, the transmitter 12 is powered completely from power received over process control loop 16. Data related to the sensed process variable is transmitted over loop 16, in a digital or analog format, to control room 14 or to other equipment on loop 16.

Link 70 provides a secure communication link to electronic circuitry 60 without requiring additional feedthroughs through barrier 44. Further, the link 70 does not require an additional power source for operation. By reducing the number of feedthroughs and reducing the requirements for additional power sources, the manufacturing costs are also lowered. Further, this configuration provides flexibility in packaging.

Transmitter electronic circuitry 60 can comprise any type of circuitry in which it is desired to have the circuitry separated from circuitry 50. Specific examples includes a meter or display such that information can be displayed locally at the transmitter 12. For example, readings from sensor 54 can be displayed or setting or configuration information related to transmitter electronic circuitry 50. Another example of circuitry 60 includes switches for locally controlling process control elements such as valves or other components. In another example, circuitry 60 can comprise input circuitry such as push buttons for receiving a manual input or an electronic coupling configured to couple to configuration and monitoring circuitry. In such embodiments, inputs through circuitry 60 are used to program, calibrate and/or interrogate transmitter electronic circuitry 50.

FIG. 2 is a perspective view of transmitter 12. In FIG. 2, transmitter electronic circuitry 60 is illustrated as a display. The display can display sensor values, calibration information, diagnostic information, etc. Also shown in phantom in FIG. 2 are the positions of sensor 54, circuitry 50, and barrier 44, transducers 64 and 62.

FIG. 3 is a simplified block diagram of a control system 100 in accordance with another embodiment of the present invention. Control system 100 is shown as including multiple transmitters, transmitter 12A, 12B and 12C, coupled to process control loop 16. Although FIG. 3 illustrates a single process control loop 16, or multiple process control loops 16 can be used as desired. A field meter 102 couples to process control loop. The meter 102 can couple to the same loop 16 as transmitters 12, or to a different control loop 16. Non-physical electromagnetic links 106 provide a communication link between transmitters 12A, 12B and 12C and meter 102. The link can be unidirectional as shown in FIG. 3 or bidirectional. The links can be at different frequencies, occur at differing times, or use coding techniques such that data to or from the different transmitters can be differentiated.

In the embodiment of FIG. 3, a single meter 102 is used to monitor multiple transmitters 12A, 12B and 12C. Further, in some instances, a transmitter 12 is positioned such that it is difficult to view. In such an embodiment, meter 102 can be placed in a more easily visible location such that an output from transmitter 12 can be viewed.

Meter 102 along with transmitters 12A, 12B and 12C can be completely powered with power received over process control loop 16. In one embodiment, element 102 shown in FIG. 3 comprises a switch or other device for controlling the process, or an input for providing input to transmitters 12A, 12B and 12C. Transmitters 12A, 12B and 12C can also include an internal non-physical communication link 70 such as that illustrated in FIG. 1 to communicate with transmitter electronic circuitry 60 carried within the particular transmitter 12A, 12B and 12C.

Although the present invention has been described with reference to preferred embodiments, workers skilled in the art will recognize that changes may be made in form and detail without departing from the spirit and scope of the invention. In various aspects of the present invention, a reduction in the number of feedthroughs in the housing of a transmitter is achieved. The invention does not require additional batteries or power supplies and reduces costs associated with multiple feedthroughs. Further, the invention provides greater flexibility in the packaging and configuration of process transmitters. The invention can be used with other types of transmitter configurations, process variable sensors, or process control loops. Data on the communication link can be in accordance with any desired format. The data carried on the link can be any type of data including process variable, programming, calibration and configuration data.

What is claimed is:

1. A process transmitter configured to measure a process variable of an industrial process, comprising:
    a process variable sensor configured to sense the process variable and responsively provide a process variable sensor output;
    first transmitter electronic circuitry coupled to the process variable sensor;
    second transmitter electronic circuitry configured to cooperate with the first transmitter electronic circuitry;
    a two-wire process control loop coupling configured to provide power to the circuitry from a two-wire process control loop;
    a housing having a first cavity housing the first transmitter electronic circuitry, the housing including a barrier between the first transmitter electronic circuitry and the second transmitter electronic circuitry; and
    a non-physical electromagnetic link between the first transmitter electronic circuitry and the second transmitter electronic circuitry configured to carry data therebetween.

2. The apparatus of claim 1 wherein the non-physical electromagnetic link comprises a radio frequency (RF) link.

3. The apparatus of claim 2 including first and second antennas coupled to respective first and second transmitter electronic circuitry.

4. The apparatus of claim 1 wherein the non-physical electromagnetic link comprises a capacitive coupling.

5. The apparatus of claim 4 including first and second capacitive plates positioned proximate one another on opposed sides of the barrier, the first and second capacitive plate coupled to respective first and second transmitter electronic circuitry.

6. The apparatus of claim 1 wherein the non-physical electromagnetic link comprises an inductive coupling.

7. The apparatus of claim 6 including first and second inductors positioned proximate one another on opposed sides of the barrier, the first and second inductors coupled to respective first and second transmitter electronic circuitry.

8. The apparatus of claim 1 wherein the second transmitter electronic circuitry comprises a display.

9. The apparatus of claim 1 wherein the second transmitter electronic circuitry comprises a manual input.

10. The apparatus of claim 1 wherein the first and second electronic circuitry couple to the two-wire process control loop.

11. The apparatus of claim 1 wherein the second transmitter electronic circuitry is positioned within the housing.

12. The apparatus of claim 1 wherein the second transmitter electronic circuitry is spaced apart from the housing.

13. The apparatus of claim 1 wherein the data comprises a process variable.

14. The apparatus of claim 1 wherein the data comprises calibration data.

15. The apparatus of claim 1 wherein the data comprises programming data.

16. The apparatus of claim 1 wherein the data comprises configuration data.

17. The apparatus of claim 1 wherein the second transmitter electronic circuitry is completely powered by the first transmitter electronic circuitry over the non-physical electromagnetic link.

18. A process monitoring system comprising:
    process transmitter configured to measure a process variable of an industrial process, comprising:
        a process variable sensor configured to sense the process variable and responsively provide a process variable sensor output;
        first transmitter electronic circuitry coupled to the process variable sensor;
        a two-wire process control loop coupling configured to provide power to the circuitry from a two-wire process control loop;
        a housing having a first cavity housing the first transmitter electronic circuitry, the housing including a barrier between the first transmitter electronic circuitry;
        second transmitter electronic circuitry spaced apart from the process transmitter configured to cooperate with the first transmitter electronic circuitry; and
        a non-physical electromagnetic link between the first transmitter electronic circuitry and the second transmitter electronic circuitry configured to carry data therebetween.

19. The apparatus of claim 18 wherein the second transmitter electronic circuitry is configured to communicate with a plurality of first transmitter electronic circuitry in a plurality of transmitters through a plurality of non-physical electromagnetic links.

20. The apparatus of claim 19 wherein the second transmitter electronic circuitry comprises a display to display data from the plurality of transmitters.

21. A method of providing an output from a transmitter, comprising:
    coupling first transmitter electronic circuitry to a process variable sensor configured to sense a process variable;
    enclosing the first transmitter electronic circuitry in a hermetically sealed cavity;
    placing second transmitter electronic circuitry outside the cavity, the second transmitter electronic circuitry separated from the first electronic circuitry by a barrier;
    providing loop connections to couple the transmitter to a two-wire process control loop, the transmitter configured to be completely powered from the process control loop; and
    coupling the first transmitter electronic circuitry to the second transmitter electronic circuitry by a non-physical electromagnetic link.

22. The method of claim 21 wherein the second transmitter electronic circuitry comprises a display.

23. The method of claim 21 wherein the second transmitter electronic circuitry comprises a manual input.

24. The method of claim 21 wherein the non-physical electromagnetic link comprises a radio frequency (RF) link.

25. The method of claim 21 wherein the non-physical electromagnetic link comprises a capacitive coupling.

26. The method of claim 21 wherein the non-physical electromagnetic link comprises an inductive coupling.

27. The method of claim 21 wherein the second transmitter electronic circuitry is completely powered by power received over the non-physical electromagnetic link.

28. The method of claim 21 including transmitting process variable data over the non-physical electromagnetic link.

29. The method of claim 21 including transmitting calibration data over the non-physical electromagnetic link.

30. The method of claim 21 including transmitting programming data over the non-physical electromagnetic link.

31. The method of claim 21 including transmitting configuration data over the non-physical electromagnetic link.

* * * * *